ial No. 531,672

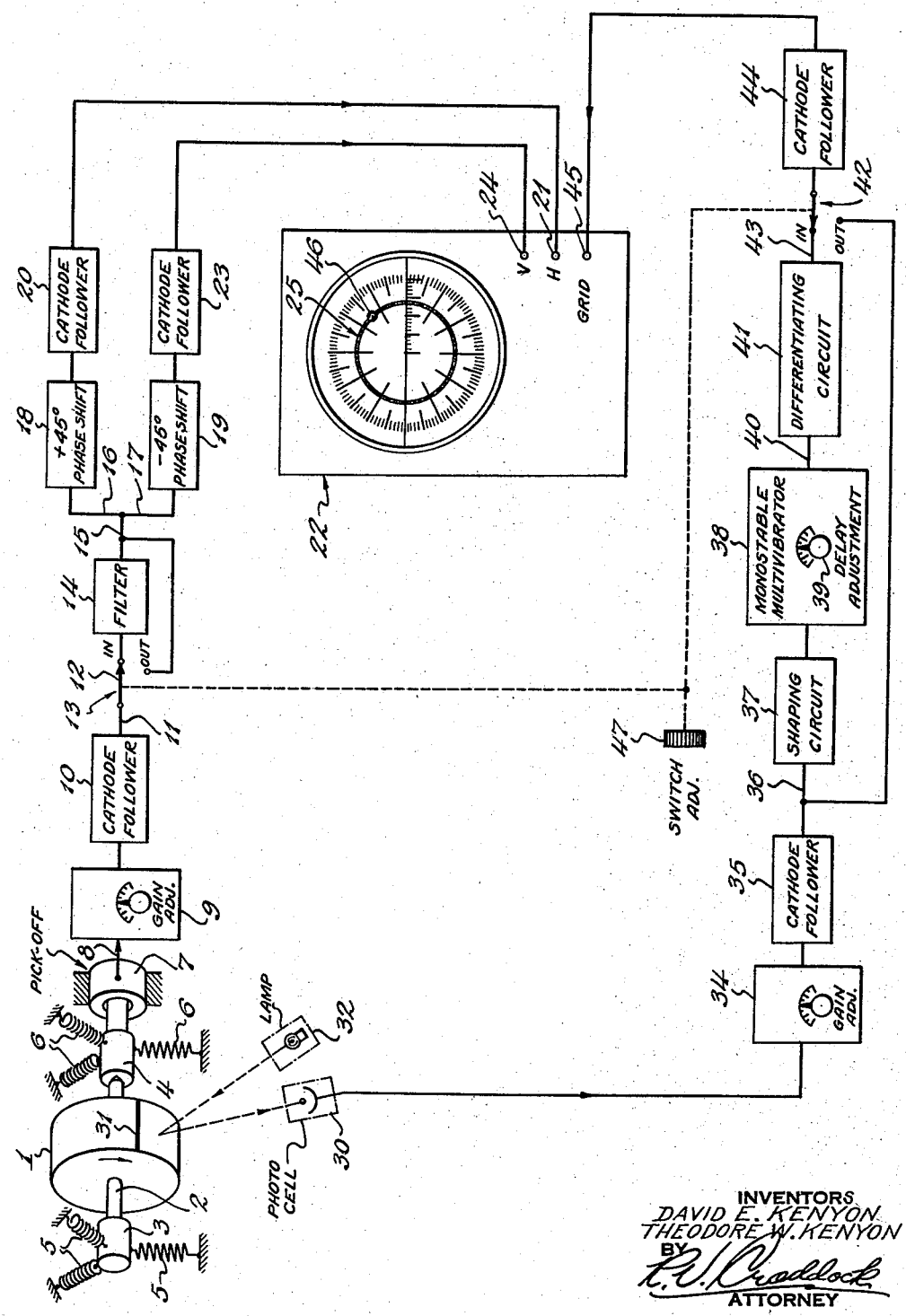

United States Patent Office 2,924,977
Patented Feb. 16, 1960

2,924,977

ROTOR DYNAMIC UNBALANCE ANALYZING SYSTEM

David E. Kenyon, Huntington, N.Y., and Theodore W. Kenyon, Old Lyme, Conn.; said David E. Kenyon assignor to Sperry Rand Corporation, a corporation of Delaware Application August 31, 1955, Serial No. 531,672

4 Claims. (Cl. 73—465)

This invention relates to the analyzing of rotors for dynamic mass unbalance. More particularly, the invention concerns a novel and improved system for rapidly and accurately determining the magnitude of such unbalance and its location on the rotor being analyzed.

An object of the present invention is to provide improved means for jointly indicating the magnitude and location of dynamic mass unbalance in a rotating rotor wherein the indicating means is responsive in one sense according to a first signal that varies continuously with vibration of the rotor and in another sense according to a second signal that is generated only when a given axially-displaced portion of the rotor passes a fixed point adjacent the rotor.

Another object is the provision of a band pass filter in the arrangement of the foregoing object for eliminating noise frequencies from the first signal that are different from the rotor rotational frequency, and of additional means for delaying the second signal by an amount equal to the time delay produced by the filter.

Another object is to provide a circular Lissajous pattern on the face of a cathode ray tube, which pattern has a diameter proportional to the magnitude of dynamic unbalance of an axially-spinning rotor, and further to provide a localized deviation on said pattern in a position dependent upon the location of the rotor's dynamic unbalance.

Another object is the provision of an improved dynamic unbalance analyzing system for rotors wherein a rotor under test may be driven or allowed to coast through a broad range of speeds while supplying a uniform indication of unbalance magnitude and location.

Another object is to provide a novel electronic dynamic unbalance analyzing system for rotors, which system may be readily calibrated, and which, when calibrated, is in condition to accurately analyze the unbalance characteristics of a rapid succession of rotors.

Other objects and advantages will become apparent from the specification taken in connection with the accompanying drawing, wherein is illustrated a schematic diagram of a preferred embodiment of the invention.

In the drawing, a rotor 1 having an axle or shaft 2 is rotatably mounted in a pair of compliant bearings 3, 4 supporting the shaft on opposite sides of the rotor. For illustrative purposes, bearings 3, 4 are depicted as being resiliently suspended by two groups 5, 6 of three radially-disposed symmetrically-arranged coil springs 120° apart, as described in U.S. Patent No. 2,622,437 issued December 23, 1952, to K. F. Frank. It is to be understood, however, that any compliant bearing arrangement is suitable so long as it permits shaft 2 to vibrate in response to mass unbalance of rotor 1 when the rotor is spun about its axis. The motion resulting at the ends of shaft 2 from rotor unbalance is approximately circular in a plane perpendicular to the shaft.

Means for spinning the rotor 1 are omitted from the drawing for reasons of simplification. Such means are well-known and may, for example, be pneumatic, electrical or mechanical in nature to suit the form that rotor 1 takes. That is to say, if rotor 1 is the bucket-rimmed wheel of an air-driven gyroscope, the spinning means would preferably comprise a jet tube arranged to supply a jet of air under pressure against the rim of the wheel for impelling the same.

A pick-off 7 is provided for detecting the vibratory excursions of the spinning rotor shaft 2. The pick-off is so arranged in relation to shaft 2 and is of such form that the vibrations of the shaft are thereby transduced into a generally sinusoidal alternating current signal on pick-off output lead 8 having a period equal to the time it takes rotor 1 to spin through one revolution and having a magnitude dependent upon the unbalance of the rotor. Pick-offs with these properties are well-known in the rotor-balancing art, and include those of the variable capacity and variable inductance types. The illustrative pick-off 7 has an output that is in accordance with the vibrations of the rotor in a single plane. A pick-off such as shown in Fig. 7 of the U.S. Patent No. 2,622,437 to K. F. Frank may be utilized in the improved system to provide the required output.

The vibration signal on pick-off output lead 8 is fed via a manually actuated gain adjustment device 9 to a cathode follower 10 having an output lead 11 connected to the movable arm 12 of a two-position switch 13. In its "IN" position, switch 13 connects the output lead 11 of cathode follower 10 to a filter 14, the output of which is connected via a lead 15 to the respective input leads 16, 17 of a pair of phase-shifters 18, 19.

Phase-shifters 18, 19 may comprise lattice-type networks, for example, and are such as to provide a substantially uniform 90° phase difference between their outputs over the normal speed range of rotor 1. In this respect, phase-shifter 18 preferably causes its output to lead its input by 45° while phase-shifter 19 causes its output to lag its input by 45°. The output of phase-shifter 18 is fed via a cathode follower 20 to the horizontal deflection plate terminal 21 of a cathode ray oscilloscope 22, and the output of phase-shifter 19 is fed via a cathode follower 23 to the vertical deflection plate terminal 24 of the oscilloscope. Phase-shifters 18, 19 are of substantially equal attenuation and cathode followers 20, 23 provide substantially equal gains so that the 90° out-of-phase inputs to oscilloscope terminals 21, 24 may provide a circle pattern 25 on the face of the cathode ray tube when the unbalanced rotor 1 is spinning. The magnitude of the vibration signal produced by pick-off 7, hence the magnitude of the signals fed to oscilloscope terminals 21, 24 and the diameter of the resultant circle pattern, depends on the magnitude of the unbalance of rotor 1.

Filter 14 is a band-pass type forming a delay line and having an upper cut-off frequency that falls between the frequency of the signal produced by pick-off 7 for the highest contemplated rotor speed and the lowest noise frequency due to bearing irregularities. In a typical case, rotor 1 may be driven over a range of speeds from 12,000 to 24,000 r.p.m. The vibration signal frequency then will range from 200 to 400 c.p.s., while bearing noise freqquency is likely to range from 1000 c.p.s. upwards. In this instance, in order to prevent a confused pattern on the screen of oscilloscope 22, it is desirable that filter 14 greatly attenuate signals of 1000 c.p.s. or more so as effectively to prevent such higher frequency components from reaching the oscilloscope.

Besides eliminating high frequency noise components from the output of pick-off 7, filter 14 also eliminates noise components from the signal of pick-off 7 that are lower in frequency than the lowest contemplated rotor speed. Such lower frequency noise may occur, for example, from shock imparted to bearings 3, 4 by other equipment operating in the vicinity of the present system.

Another requirement for filter 14 is that it have a substantially linear phase shift v. frequency characteristic within the frequency range of the vibration signal so that the inherent time delay of the filter remains constant for this range. The importance of this requirement will become apparent as the description of the remainder of the system proceeds. Thus, too will the purpose for providing the other position or "OUT" position of two-position switch 13 become apparent. Suffice it to say for the time being, however, that when switch arm 12 is moved to the "OUT" position, filter 14 is removed from the system, and the output of cathode follower 10 is fed directly to phase-shifters 18, 19.

Referring to the remainder of the system, a photocell 30 is shown illuminated by reflection from the rim surface of rotor 1 which surface preferably has a narrow dark stripe 31 painted transversely thereacross. A light source 32 is arranged to project a pencil beam against the rim surface of rotor 1 for reflection to the photocell, and is preferably D.-C. excited to avoid possible stroboscopic effects. Thus, the rotation of rotor 1 produces a pulse on photocell output lead 33 for every revolution of the rotor. The width or duration of the pulse depends on the width of stripe 31. The time of occurrence of the pulse signals coincides with the passage of the reference point or stripe 31 with regard to the fixed optical system provided by lamp 32 and cell 30. The stator of pick-off 7 is also fixed in relation to a rotor 1 whose condition of unbalance is known and its output is synchronized with the pulse in the known balance condition of the rotor. With rotors of unknown balance and a departure from this condition, the relative timing of the pulse with regard to the phase of the pick-off signal is such as to provide a measure of the location of the unbalance of the rotor under test from the reference point 31.

Photocell output lead 33 is connected via a manually-actuated gain adjustment device 34 to a cathode follower 35. The output of cathode follower 35 is fed via a lead 36 to a shaping circuit 37 for sharpening the pulses produced by photocell 30. The output of shaping circuit 37 is then fed to a monostable multivibrator 38 for triggering the same into an unstable state of operation having a duration depending on the multivibrator's time constant. Manual adjustment of the time constant of multivibrator 38 may be performed by actuation of an adjustment knob 39 which functions to vary one or more of the time constant determining parameters in the multivibrator circuit.

The output of multivibrator 38, as it appears on a lead 40, is a series of negative square wave pulses of width or duration dependent on the adjustment given to knob 39. These pulses are fed via lead 40 to a differentiating circuit 41 which transforms each square wave pulse into a negative spike-like pulse followed by a positive spike-like pulse, the generation of the latter being delayed by a time interval equal to the duration of the square wave pulse.

When a two-position switch 42 is in a first or "IN" position, the output of differentiating circuit 41 is fed via a lead 43 and the switch to a cathode follower 44, the output of which is connected to the intensity control grid terminal 45 of oscilloscope 22. Thus, the positive spikes from circuit 41 produce an intensified or bright spot 46 on the circle pattern 25, while the negative spikes produce a blank spot on the pattern. Only the bright spot serves a useful function in the present system; hence, if desired, the negative spikes may be prevented from reaching grid-terminal 45 by a diode, for example, connected across the output of circuit 41 to short-circuit the negative spikes to ground.

When switch 42 is actuated to its second position or "OUT" position, the output of cathode follower 35 is connected directly to cathode follower 44, and the output of differentiating circuit 41 is simultaneously disconnected from cathode follower 44. Switches 42 and 13 are mechanically coupled to a switch knob 47 for joint operation to their "OUT" or "IN" positions depending on the actuation of knob 47.

The "OUT" positions of switches 42 and 13 are provided for system calibration purposes prior to the testing of a rotor for unbalance magnitude and location.

In order to calibrate the system, a calibrating rotor having a known unbalance magnitude located at a known angular distance from a dark stripe painted transversely across the rotor's rim is mounted in the compliant bearings 3, 4 and is spun at any speed falling within the operational range considered for the selection of filter 14 and phase-shifters 18, 19. Preferably, the calibrating rotor has an unbalance of sufficient magnitude to provide an unbalance signal that is precise and distinct relative to noise signal components. The next step is to adjust gain device 9 and the usual gain controls on oscilloscope 22 to produce as good a circular Lissajous pattern as is feasible on the face of the cathode ray tube from the signal produced by pick-off 7. For this operation, switches 13, 42 may be in either of their two positions, although the "IN" position is preferable since this places filter 14 in the circuit and clears the circle pattern of superimposed noise.

Once the circle pattern has been established, switch knob 47 is actuated to operate switches 13, 42 to their "OUT" positions, if not already so actuated. The successive photocell-derived pulses fed around multivibrator 38 to oscilloscope grid terminal 45 produce a bright spot on the circle pattern. The location of this spot is noted for reference purposes and preferably marked directly on the face of the cathode ray tube.

It has been shown that the location of the bright spot thus obtained is determined by the relation between the time of occurrence of the pulse signal and the phase of the pick-off signal. Accordingly, it is a measure of the location of the mass unbalance of the calibrating rotor. Hence, if a test rotor of unknown, yet different, unbalance and having a black stripe painted across its rim is substituted for the calibrating rotor, a new bright spot is produced at a different relative location on a similar circle pattern due to a change of phase of the vibration signal. The angular distance between the original or reference bright spot and the new bright spot is then the distance beyond the known angular distance of the unbalance of the calibrating rotor from the dark stripe thereon that the unbalance of the test rotor is angularly located from the dark stripe thereon.

It may be exceedingly difficult, however, to accurately fix the location of the new bright spot on the circle pattern in view of the noise that shows up on the cathode ray tube face when filter 14 is out of the system. This is particularly true when the unbalance of the test rotor is small and the ratio of vibration signal to noise signal is thereby diminished. Hence, before a test rotor is substituted for the calibrating rotor, the switches 13, 42 are operated to their "IN" positions for placing filter 14 and multivibrator 38 in the system.

Unless the time delay provided by multivibrator 38 matches the constant time delay provided by filter 14, the bright spot produced by the calibrating rotor with the switches "IN" will be angularly displaced from the original location noted therefor. Assuming a delay mismatch, adjustable delay knob 39 is actuated to move the bright spot to the location it had when switches 13, 42 were in their "OUT" positions, thereby to compensate the time delay of filter 14 with an equivalent time delay of multivibrator 38.

As soon as the time delay produced by filter 14 is compensated as set forth above, the calibration procedure is complete and the accurate testing of a test rotor may commence. Accordingly, a test rotor of unknown unbalance characteristics and having a black stripe painted across its rim is substituted for the calibrating rotor and is spun within the prescribed speed range. Since the time delay of filter 14 is constant within this range, the spinning means may be deactivated after the test rotor is brought up to top speed so that the rotor may coast through its speed range. This has the advantage of eliminating any noise signal produced by the spinning means itself, while allowing ample time for performing the test. The angular location of the bright spot produced by the test rotor is noted. The angular distance between this bright spot and the reference bright spot is then measured to yield the desired test information. That is to say, the location of the unbalance of the test rotor may then be determined by adding the measured angular distance between the reference and test bright spots to the angular distance between the known unbalance of the calibrating rotor and the stripe thereon. The resultant or total angular distance is the angular distance between the unknown unbalance of the test rotor and the stripe thereon.

To facilitate the measurement of angular distance between the reference and test bright spots, it is suggested that a transparent 360° protractor-type screen be fitted over the face of the cathode ray tube in an angularly adjustable manner so that the 0° index of the protractor may be aligned with the reference bright spot.

The magnitude of the unbalance is indicated by the diameter of the circle pattern provided on the oscilloscope. It will be apparent, therefore, that gain adjustment device 9 may be calibrated, for example, in terms of drill depth required to obtain mass balance, and be adjusted for each test rotor so as to bring the circle pattern into agreement with a fixed graticule, i.e., a circular mark of fixed diameter, on the cathode ray tube face or on the aforementioned suggested protractor-type screen over the tube face. Alternatively, all gain controls may be locked after system calibration is complete, and the face of the cathode ray tube or the aforementioned protractor-type screen may be provided with a diametral scale suitably calibrated in terms of corrective drill depth.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system for analyzing a rotor for dynamic mass unbalance, means for supporting said rotor for rotation and simultaneous vibration while said rotor is rotating, first electrical generating means for providing an alternating current signal of an amplitude depending on the vibration of the rotor and of a frequency depending on the rotational speed of the rotor, means coupled to said generating means for filtering said signal to eliminate components of a frequency different than the rotational frequency of the rotor and provide a fixed time delay for the signal, a cathode ray tube having electron beam deflecting means and an intensity control grid, means coupling said filtering means and said tube deflecting means for forming a circular Lissajous pattern on the face of the tube of a diameter proportional to the amplitude of the signal output of said filtering means, second electrical generating means for providing a signal pulse whenever a given external point on said rotor is borne by rotation of the rotor past a fixed position adjacent the rotor, a multivibrator receiving said pulse signal providing a time delay for the signal corresponding to the time delay of said filtering means, and means for coupling said multivibrator to said intensity control grid to produce a recurrent intensity variation on said circular pattern located thereon according to the angular distance of said point on said rotor from the center of mass unbalance of said rotor.

2. A system as claimed in claim 1, in which the coupling means between the tube deflecting means and filter means includes a first phase shifter providing a signal output leading the phase of the signal of the filter means by forty-five degrees and a second phase shifter providing a signal output lagging the phase of the signal of the filter means by forty-five degrees.

3. A system as claimed in claim 1, in which the coupling means between the intensity control grid and the multivibrator includes a differentiating circuit.

4. A system for determining the magnitude and location of dynamic mass unbalance in a rotating rotor over a preselected range of rotor speeds comprising a rotational support for said rotor permitting the rotor to vibrate in accordance with dynamic mass unbalance therein, a first electrical pick-off providing an alternating current signal of an amplitude depending on the vibration of the rotor and of a frequency depending on the rotational speed of the rotor, a filter connected to said pick-off for eliminating components of said signal of a frequency different than the rotational frequency of the rotor and providing a fixed time delay for the signal, a second pick-off responsive to rotation of said rotor providing a signal pulse whose time of occurrence corresponds to the passage of a reference point on the rotor part a predetermined point in space, a multivibrator connected to said second pick-off providing a time delay for the pulse signals corresponding to the fixed time delay provided by said filter, and means including an indicator coupled to said filter and said multivibrator for indicating the amplitude of the signal output of said filter and the time of occurrence of the output of said multivibrator with relation to the phase of the output of said filter, the amplitude of the output of the filter being a measure of the magnitude of unbalance of the rotor while the time and phase relation is a measure of the location of the unbalance of the rotor from the reference point thereon.

References Cited in the file of this patent
UNITED STATES PATENTS

| 2,130,122 | Dyboig | Sept. 13, 1938 |
| 2,381,645 | Carlstein | Aug. 7, 1945 |
| 2,461,645 | Kallmann | Feb. 15, 1949 |
| 2,622,437 | Frank | Dec. 23, 1952 |

FOREIGN PATENTS

| 655,151 | Great Britain | July 11, 1951 |